J. M. HUNTER.
Flour-Sifter.
No. 218,121. Patented Aug. 5, 1879.
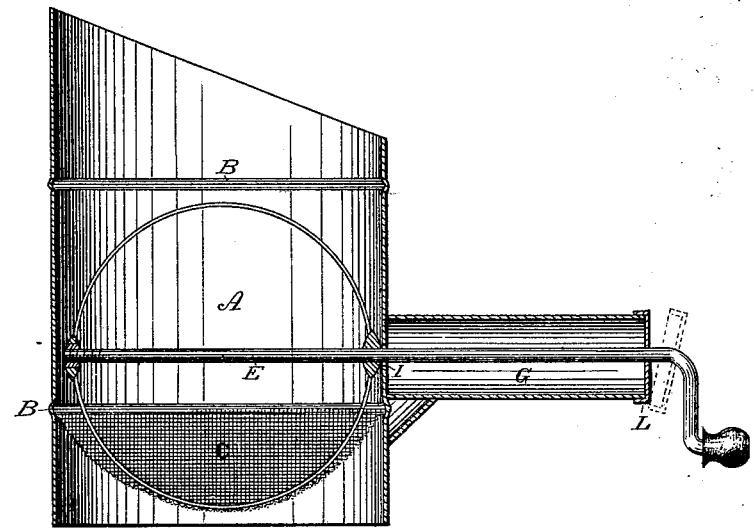
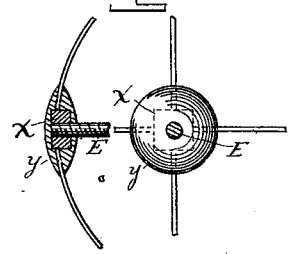
Witnesses:
J. W. Garner
W. S. O. Haines
Inventor:
J. M. Hunter,
per
F. A. Lehmann,
Atty.

UNITED STATES PATENT OFFICE.

JACOB M. HUNTER, OF CINCINNATI, OHIO.

IMPROVEMENT IN FLOUR-SIFTERS.

Specification forming part of Letters Patent No. 218,121, dated August 5, 1879; application filed November 14, 1878.

*To all whom it may concern:*

Be it known that I, JACOB M. HUNTER, of Cincinnati, in the county of Hamilton and State of Ohio, have invented certain new and useful Improvements in Flour-Sifters; and I do hereby declare the following to be a full, clear, and exact description of the invention, such as will enable others skilled in the art to which it pertains to make and use it, reference being had to the accompanying drawing, which forms part of this specification.

My invention relates to an improved flour-sifter, scoop, and measure; and it consists in making the end of the handle of the measure or scoop removable, so as to allow any moisture or water that may get therein to be readily removed, and facilitate the removal and insertion of the angular shaft.

The accompanying drawing represents a vertical section of my invention.

A represents a scoop, measure, and sifting-body combined, and which has two or more swages, B, formed around its sides for the purpose of marking measures upon the scoop. In the lower one of these swages the edge of the screen C is soldered, for the double purpose of not only making the screen stronger and more durable at its point of connection with the scoop, but for giving a more perfect finish. The shaft E passes through the handle G and through the sifting device, and has its inner end screwed into the sifting device, instead of being made permanently fast thereto, so that both the shaft and the sifting device can be removed at will.

In straining fruit and other substances in which there is more or less moisture, the moisture passes through the hole I into the handle, where it is almost impossible to remove it if the handle is made in the usual way. This moisture not only causes the handle to rust, but remains in it until flour, meal, or some other substance is to be sifted, and then just as likely as not this moisture will run through the hole I and mix with the flour or meal. In order to prevent this, I make the end L of the handle removable, so that at any time it can be cleaned and dried out, the same as every other part of the sifter.

By thus making the end of the handle removable, and screwing the sifting device upon the end of the shaft, the entire sifter can be taken apart and cleaned whenever it is so desired.

A nut, $x$, is placed in a mold, and a soft-metal body, $y$, is cast around it, as shown, so as to hold the ends of the wires of the sifting device in contact with the sides of the nut.

I am aware that a flour-sifter composed of a scoop with concave screen and a revolving agitator, the shaft of which passes through the hollow handle of the scoop, is not new; but in such case, as known to me, the shaft was not removable, and there was no means for cleaning out the handle.

By my invention the hollow handle can easily be cleaned out at any time, and the insertion of a new screen is facilitated when the old one becomes worn out or broken.

Having thus described my invention, I claim—

The combination of the scoop A with screen C, the hollow handle G, projecting from the scoop, the agitator-shaft E, passing longitudinally through the hollow handle and removable from the agitator, and the removable cap L on the end of the handle, all constructed substantially as and for the purposes herein set forth.

In testimony that I claim the foregoing I have hereunto set my hand this 13th day of November, 1878.

JACOB M. HUNTER.

Witnesses:
   F. A. LEHMANN,
   W. S. D. HAINES.